UNITED STATES PATENT OFFICE.

EDUARD POHL, OF RHÖNDORF-ON-THE-RHINE, GERMANY.

PROCESS OF MAKING SINTERED MAGNESITE AND DOLOMITE.

1,103,375.    Specification of Letters Patent.    Patented July 14, 1914.

No Drawing.    Application filed April 8, 1913.    Serial No. 759,794.

*To all whom it may concern:*

Be it known that I, EDUARD POHL, a citizen of the German Empire, and residing at Rhöndorf-on-the-Rhine, Germany, have invented a certain new and useful Improved Process of Making Sintered Magnesite and Dolomite, of which the following is a specification.

The subject-matter of my invention is a new process of producing sintered magnesite and dolomite.

Progress in arts in which high temperatures are employed is frequently dependent on the employment of suitable highly refractory materials. Magnesite has proved to be specially suitable. Of this raw material only the crystalline magnesite is employed in the industry. Both the dense magnesite and also magnesia compounds obtained chemically, *e. g.* waste products, are not used for the manufacture of magnesite bricks and other highly refractory products because they sinter only at temperatures which cannot be economically obtained when working on a large scale. Of the crystalline magnesites occurring in nature which are rarely pure only those can be employed whose percentages of fluxes does not exceed predetermined narrow limits. If the percentage of ferric oxid, for example, exceeds this limit such a magnesite is considered unusable. Magnesite works are therefore compelled carefully to sort the broken material. The magnesite is then heated in suitable kilns to a temperature at which complete sintering occurs. This sintered magnesite is by no means a product which can be at once sold; on the contrary, it must be subjected to another sorting operation, in which the impure pieces are rejected. This process of obtaining sintered magnesite customary heretofore is not only very expensive on account of the large amount of labor entailed, but also very troublesome on account of the large quantity of waste. Lastly, in spite of the greatest care being observed the percentage of impurities in the product nevertheless fluctuates considerably. By means of the hereindescribed process not only are the difficulties removed which existing magnesite works have to fight against, but the raw materials, *i. e.* dense and very pure magnesite, which were unsuitable heretofore can be worked up into high grade sintered magnesite.

According to my new process magnesium carbonate ($MgCO_3$), magnesium containing waste products and similar substances are ground when they are not already present as powder or in solution, *e. g.* chlorid of magnesium lye. The powder or mud is mixed well in silos or settling tanks and left to settle, and separate according to the degree of purity. Analyses are made of the various powders or muds, and on the basis of the analysis a mixture of crude powder or thick mud of a predetermined composition is made by suitable intimate mixing of the various powders or muds, whereupon this mixture is burnt either in the form of bricks in the shaft-kiln, rotary kiln or gas-heated kiln, or in a form other than that of bricks in the revolving tubular kiln until sintering takes place. If only quite pure magnesites are at disposal suitable fluxes, *e. g.*, iron, clay, bauxite or the like, will be added in exactly predetermined quantities to the crude powder or thick mud and intimately mixed therewith. It is preferable to add the fluxes before or during the grinding operation in order to obtain as uniform a mixture as possible.

The crude powder or mud made from pure magnesite is burnt in the same manner in the shaft-kiln, rotary kiln, gas-heated kiln or revolving tubular kiln. If necessary, coal or coke may be mixed with the crude mixture during or after its manufacture. The crude mixture may be dried before it is charged into the revolving tubular kiln.

When carrying my process into practice it is preferable to use the grinding, mixing, settling and burning apparatus which have been tested and found satisfactory in the manufacture of Portland cement. It follows that Portland cement works can readily take up the profitable manufacture of sintered magnesite. This sintered magnesite can be supplied having always the same composition to the consumer, and a guarantee for its composition can be given.

Briefly stated, it is the object of the invention to facilitate by the grinding operation the combustion to sinter and to produce from the raw material of more or less purity or capability of sintering, a raw material of the same quality and from this material a sinter-magnesite or sinter-dolomite of a certain distinct property from which thereafter the various fireproof or refractory objects are manufactured.

Heretofore the crushed magnesite was carefully assorted and thereafter heated to sintering and then assorted again in order to eliminate all impure objects. This assorting which had to be performed twice, necessitated an increase in wages to be paid and resulted in considerable waste. Therefore the known processes of this kind are very tedious and expensive and a material of non-uniform and fluctuating purity is obtained. All these disadvantages are overcome by the object of the present invention and therefore raw materials which heretofore could not be used for the purpose in question, as for instance compact and very pure magnesites may be now used for producing a high grade of sinter-magnesite.

The method according to the present invention is executed in the following manner: The raw magnesite or waste products are ground and are separated according to their degree of purity. The composition of the various mixtures is ascertained by analysis and the mixtures are then mixed together in such a manner that a raw material in shape of a flour or meal is obtained which after being suitably formed is burnt to sinter. However the method may also be executed in the following manner without deviating from the spirit and scope of the present application: The various composite raw materials are mixed and then ground and finally burnt.

I claim:—

1. The method of producing sinter burnt magnesite consisting in transforming the raw magnesite into a mealy mass of uniform composition throughout by working pure raw materials with less pure materials, and finally burning the mass to sinter.

2. The method of producing sinter burnt magnesite and dolomite consisting in transforming the raw magnesite and dolomite into a slimy and mealy mass of uniform composition throughout by working pure raw materials with less pure materials, and finally burning the mass to sinter.

3. The method of producing sinter burnt magnesite and dolomite, consisting in transforming the raw magnesite and dolomite into a slimy and mealy mass of uniform composition throughout by working pure raw materials with sintering producing elements, and finally burning the mass to sinter.

4. The method of producing sinter burnt magnesite and dolomite, consisting in transforming the raw magnesite and dolomite into a slimy and mealy mass of uniform composition throughout by working pure raw materials with iron, clay, bauxite and similar sintering elements, and finally burning the mass to sinter.

In testimony whereof I affix my signature in the presence of two witnesses.

EDUARD POHL.

Witnesses:
　ANIS VANDORG,
　GERTRUCH SCHIFER.